US012589448B2

(12) United States Patent  (10) Patent No.: US 12,589,448 B2
Ozanam et al.  (45) Date of Patent: Mar. 31, 2026

(54) METHOD FOR CUTTING A PANEL MADE OF LAMINATED GLASS

(71) Applicant: SAINT-GOBAIN GLASS FRANCE, Courbevoie (FR)

(72) Inventors: Cécile Ozanam, Palaiseau (FR); Florian Bigourdan, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 151 days.

(21) Appl. No.: 18/579,632

(22) PCT Filed: Jul. 15, 2022

(86) PCT No.: PCT/EP2022/069867
§ 371 (c)(1),
(2) Date: Jan. 16, 2024

(87) PCT Pub. No.: WO2023/285656
PCT Pub. Date: Jan. 19, 2023

(65) Prior Publication Data
US 2024/0326173 A1  Oct. 3, 2024

(30) Foreign Application Priority Data

Jul. 16, 2021  (FR) ...................................... 2107695

(51) Int. Cl.
*B23K 26/402* (2014.01)
*B23K 26/0622* (2014.01)
(Continued)

(52) U.S. Cl.
CPC ........ *B23K 26/402* (2013.01); *B23K 26/0622* (2015.10); *B23K 26/082* (2015.10); *B23K 26/53* (2015.10)

(58) Field of Classification Search
CPC .............. B23K 26/402; B23K 26/0622; B23K 26/082; B23K 26/53
See application file for complete search history.

(56) References Cited

U.S. PATENT DOCUMENTS 11,078,112 B2 * 8/2021 Dahlberg ................ H01L 23/15
2012/0234808 A1 * 9/2012 Nakano .................. B23K 26/53
219/121.72

(Continued)

FOREIGN PATENT DOCUMENTS

EP  EP 3 127 875 A1  2/2017

OTHER PUBLICATIONS

International Search Report as issued in International Patent Application No. PCT/EP2022/069867, dated Sep. 8, 2022.

*Primary Examiner* — Omar Flores Sanchez
(74) *Attorney, Agent, or Firm* — CUSHMAN PARTNERS

(57) ABSTRACT

A method for separating a laminated glass panel including a film and at least two glass sheets, with the film being interposed between the two glass sheets, the method including weakening the mechanical properties of the panel using the energy of a laser beam along a predetermined separation line, by guiding the laser beam along the separation line, the separation line separating the panel into at least two pieces, wherein a laser device is used to provide the laser beam, the laser device providing a Bessel laser beam with a wavelength to which the glass sheets and the interlayer are transparent, wherein the length of the laser beam is at least equal to 80% of the thickness of the panel and the ratio of the scanning speed to the operating frequency is a value between two and seven times the diameter of the central lobe of the Bessel beam.

12 Claims, 4 Drawing Sheets

(51) Int. Cl.
> *B23K 26/082*      (2014.01)
> *B23K 26/53*       (2014.01)

(56)            References Cited

U.S. PATENT DOCUMENTS

| | | | |
|---|---|---|---|
| 2014/0340730 A1* | 11/2014 | Bergh | ............... B32B 17/10155 |
| | | | 359/275 |
| 2015/0165563 A1 | 6/2015 | Manley et al. | |
| 2017/0326688 A1* | 11/2017 | Turner | ................. B23K 26/122 |
| 2018/0057390 A1* | 3/2018 | Hackert | ................... C03C 3/093 |
| 2018/0118603 A1 | 5/2018 | Nieber et al. | |
| 2022/0288719 A1* | 9/2022 | Kirihara | ............... B23K 26/364 |

* cited by examiner

[Fig. 1]
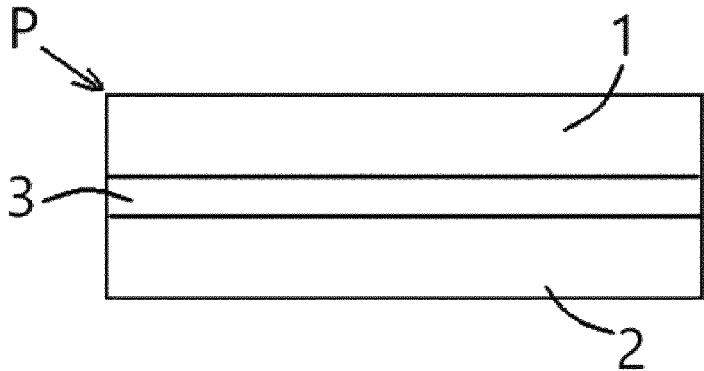
[Fig. 2]
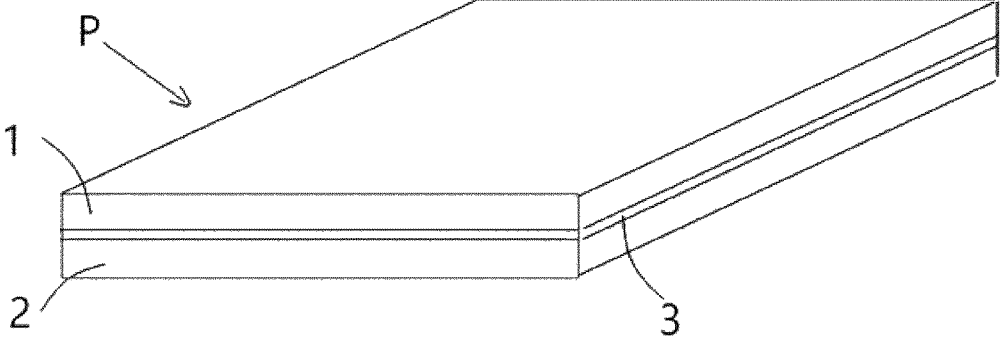

[Fig. 3]
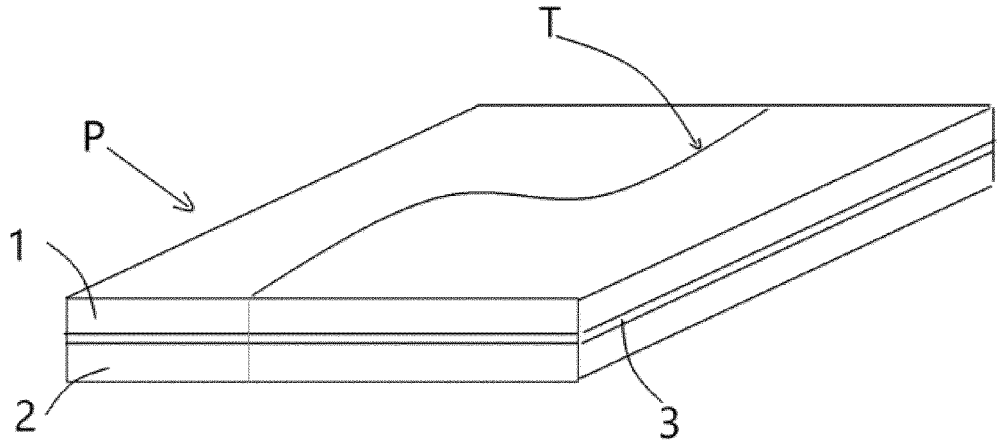
[Fig. 4]
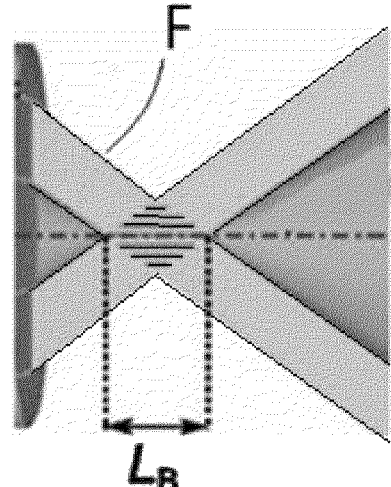

[Fig. 5]
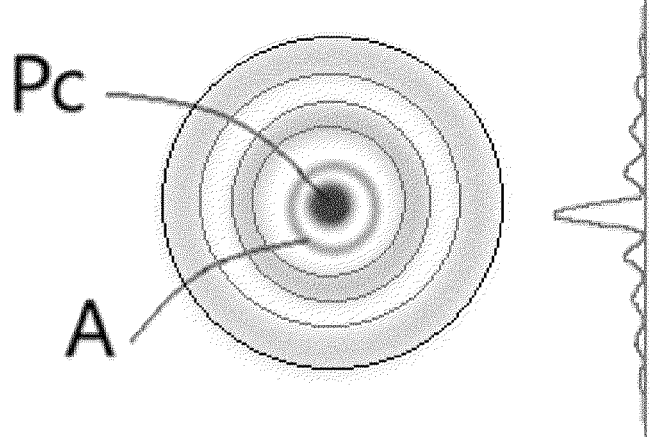
[Fig. 6]
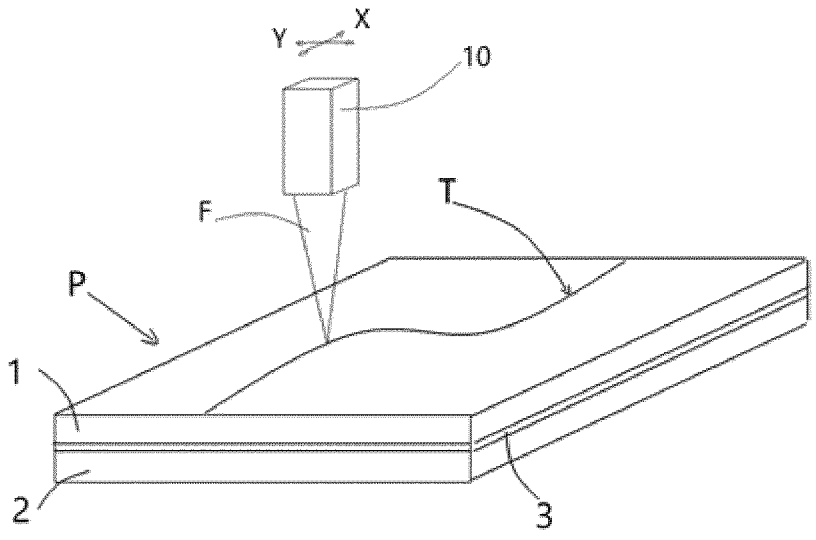

[Fig. 7]
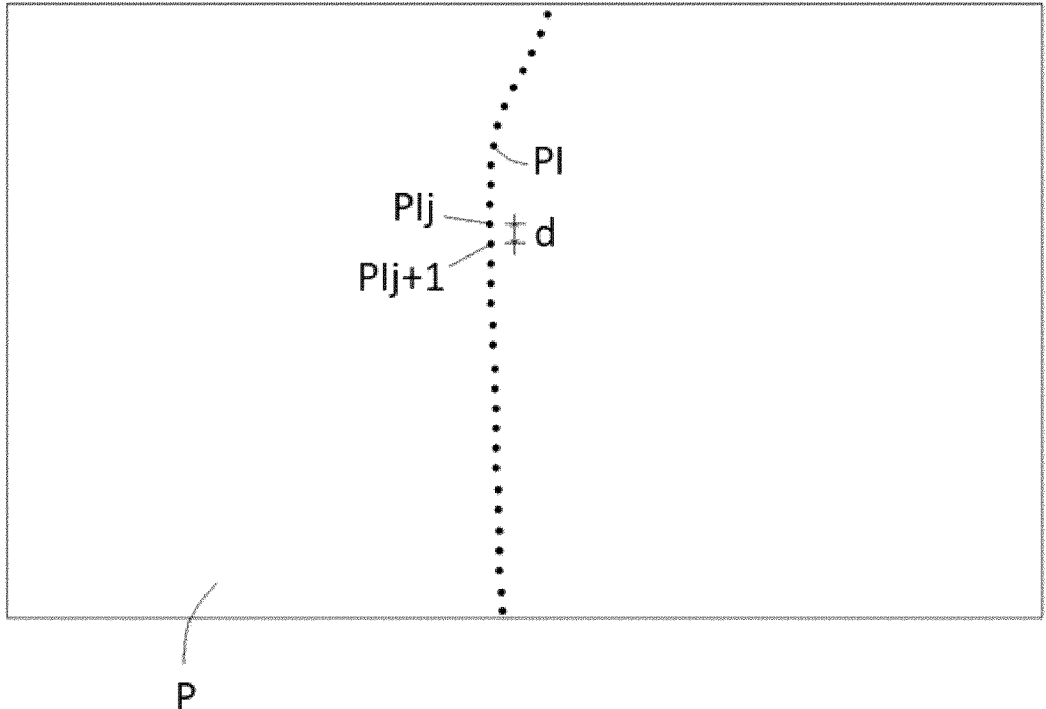
[Fig. 8]

METHOD FOR CUTTING A PANEL MADE OF LAMINATED GLASS

CROSS-REFERENCE TO RELATED APPLICATIONS

This application is the U.S. National Stage of PCT/EP2022/069867, filed Jul. 15, 2022, which in turn claims priority to French patent application number 2107695 filed Jul. 16, 2021. The content of these applications are incorporated herein by reference in their entireties.

The present invention relates to a method and a device for cutting glass, and in particular laminated glass panels.

PRIOR ART

Methods and devices for cutting sheets of glass, in particular single sheets, are known. To do this, the sheet of glass is placed on a cutting table and then a cutting tool draws a score line. This score line is used to weaken the structure of the glass sheet. Next, a separation tool is used to separate the glass sheet into pieces.

Although the method for breaking out simple sheets of glass is known, there is a need for breaking out panels of laminated glass. Such a laminated glass panel comprises a first glass sheet, a second glass sheet and an interlayer film arranged between the two glass sheets.

Indeed, it is possible to produce laminated glass panels by separately cutting two single sheets and then assembling them with an interlayer film. Nevertheless, this practice requires precisely cutting the two glass sheets and the interlayer film so that the resulting panel is of good quality.

Another solution consists of producing the laminated glass panel before cutting it. For this, it is necessary to be able to cut the entire panel directly.

One known solution consists of using a laser beam to break out each sheet of glass alternately. This therefore requires creating two score lines and handling the laminated glass panel in order to achieve the cutting of said panel.

There is therefore a need for a method for breaking out a laminated glass panel which is rapid and efficient

SUMMARY OF THE INVENTION

The present invention seeks to solve the problems of the prior art by providing a simplified method for cutting a laminated glass panel with respect to the method of the prior art.

To this end, the present invention relates to a method for separating a laminated glass panel, the laminated glass panel comprising at least one film and at least two glass sheets, the film being interposed between the two glass sheets, comprising the step of:

weakening the mechanical properties of the laminated glass panel using the energy of a laser beam at least along at least one predetermined separation line, by guiding the laser beam along the separation line, said separation line separating the panel into at least two pieces, characterized in that a laser device is used to provide the laser beam, said laser device being configured to provide a Bessel laser beam with a wavelength to which the glass sheets and the interposed film are transparent, wherein the length of the laser beam is at least equal to the thickness of the laminated glass panel and the ratio of the scanning speed to the operating frequency is a value between two and seven times the diameter of the central lobe of the Bessel beam.

According to one example, the weakening of the mechanical properties of the laminated glass panel consists of creating a series of points of impact, each point making it possible to induce a localized stress field in the glass sheets and micro-channels in the interlayer, two successive points of impact being separated by a distance equal to the ratio of the scanning speed to the operating frequency.

According to one example, the thickness of the laminated glass panel is between 2 and 30 mm. Preferably, the thickness of the laminated glass panel is greater than 4 mm.

According to one example, each point of impact is created by a single pulse.

According to one example, each point of impact is created by a group of at least two pulses.

According to one example, each pulse lasts between 0.1 and 100 ps, or even between 0.1 and 10 ps.

According to one example, the rate between two single pulses or two groups of pulses is between 1 and 1000 kHz According to one example, the method further comprises a separation step consisting of applying a mechanical force.

The present invention further relates to a device for separating a laminated glass panel along at least one predetermined separation line, said laminated glass panel comprising at least one film and at least two glass sheets, the film being interposed between the glass panels, the laminated glass panel being mechanically weakened with the energy of a laser beam at least along the separation line using the method according to the invention, said device comprising breaking means making it possible to exert mechanical pressure on the separation line to separate at least two pieces of the laminated glass panel.

According to one example, the laser beam is generated by a laser device capable of moving along two orthogonal axes.

According to one example, the breaking means comprise at least one pressing element for exerting said mechanical pressure on the separation line.

According to one example, the breaking means further comprise at least one counterweight element for exerting pressure on the laminated glass panel opposite said mechanical pressure on the separation line.

BRIEF DESCRIPTION OF THE FIGURES

Other particular features and advantages will become clear from the following description thereof, given by way of indication and in an entirely non-limiting manner, with reference to the appended drawings, in which:

FIGS. 1 to 2 shows a laminated glass panel used for the present invention;

FIG. 3 shows a laminated glass panel having a score line;

FIGS. 4 and 5 show a Bessel beam used in the present invention;

FIG. 6 shows a laminated glass panel and a laser device using said Bessel beam according to the invention;

FIG. 7 shows a laminated glass panel in cross-section with the score line and the bead of the breaking means;

FIG. 8 shows a laminated glass panel provided with a score line composed of a plurality of impact points;

DETAILED DESCRIPTION

In FIGS. 1 and 2, a laminated glass panel P is shown. This laminated glass panel comprises a first glass sheet 1 and a second glass sheet 2. This panel further comprises an interlayer film 3 arranged between the first glass sheet 1 and the second glass sheet 2.

Such a glass panel has a total thickness of between 2 and 30 mm. Preferably, the thickness is at least equal to 4 mm, even more preferably strictly greater than 4 mm.

This laminated glass panel is subjected to a separation method. This separation method comprises, in first step, a step consisting of providing a laminated glass panel P. The laminated glass panel P is in the form of a panel having large dimensions that must be cut into at least two pieces.

In a second step, the laminated glass panel P is treated so that a score line T is produced as visible in FIG. 3. To do so, the laminated glass panel is placed on a support such as a cutting table. The glass panel is thus laid flat.

The score line T, or separation line, is a line of weakness of the glass panel P so that said panel can be separated into several pieces.

According to the present invention, the score line is made using a laser device 10 generating a laser beam F as visible in FIG. 6. The generated laser beam F is such that it makes it possible to produce this score line T.

In order to make it possible to produce such a score line T, the laser device 10 is designed, arranged to shape the laser beam in order to obtain a Bessel beam.

Such a Bessel beam F, visible in FIG. 5, is characterized by a cross-sectional profile comprising a central point Pc and at least one ring A or annulus whose center is said central point. This central point is the area where the intensity of the beam is the highest.

The laser beam F used is also characterized by a wavelength. More particularly, the laser device is such that it emits in a wavelength range for which both the glass and the interlayer are transparent-typically in the visible or near-infrared range. In this respect, the wavelength is within a range from 400 to 1100 nm.

In order to produce the score line T, the laser beam is shaped so that its length is at least equal to the thickness of the panel. The length $L_B$ of a Bessel beam is shown in FIG. 4.

To shape this beam to the desired length, a device and parameters as present in the article Meyer et al. Appl. Phys. Lett. 114, 201105 (2019) are used.

This makes it possible to have a Bessel beam whose length $L_B$ is at least equal to 80% of the thickness of the laminated glass panel P making it possible to treat the laminated glass over its entire thickness. Thus, the two glass sheets 1, 2 and the interlayer film 3 are treated simultaneously. This value of 80% is sufficient because it has been shown that close to this length $L_B$, the power density is such that the substrate treated by these portions of the beam conforms to what is expected. This beam length advantageously makes it possible to produce the score line T in a single pass of the laser beam.

Said beam also has power and operating frequency characteristics, the operating frequency being characteristic of the duration between each pulse. Indeed, the laser beam comprises a natural frequency linked to its wavelength but also an operating frequency. The operating frequency is related to the fact that the laser beam is pulsed and that the pulses are generated with a certain frequency, called the operating frequency.

The treatment of the laser beam consists of weakening said laminated glass panel. This simultaneous weakening of the two glass sheets 1, 2 and interlayer film 3 consists of creating an area in which the material of the glass sheets is locally modified so as to induce a localized stress field and wherein the interlayer 3 has micro-channels created without ablation of material, these micro-channels extending in the direction of the thickness of the film and the material around the center of the micro-channels is probably denser.

The score line T is thus produced having a relative movement between the laminated glass panel P and the laser beam F in order for said line T to be able to be produced. Preferably, the laser device 10 is movably mounted relative to the glass panel as can be seen in FIG. 6.

According to the invention, the score line T consists of a plurality of points PI, each point corresponding to an impact of the laser beam. The distance d between each point called the point of impact PI is such that it allows each point PI to process an area of the panel P without impacting a contiguous point as seen in FIG. 8.

Indeed, the laser beam F is such that it makes it possible to create stress in each of the glass sheets 1, 2 and the micro-channels in the intermediate film 3.

However, if two points of impact PIj and PIj+1 are too close, then the point of impact PIj+1 has an influence on the preceding point of impact PIj. This influence may result in the fact that the stresses induced by the impact of the beam on the point PIj+1 causes a reduction or modification of the stresses due to the impact of the beam on the point PI. Thus, it is possible that the micro-channels created by the impact of the beam on the point PIj close by the impact of the beam on the point PIj+1. Thus, the consequence would be that the use of the beam at the point PIj+1 would make the point PIj inoperative and therefore that the score line would be unnecessary.

The invention therefore proposes to define a distance of between two points of impact making it possible to avoid this problem.

For this, the distance d between two points of contact is chosen to depend on the dimensions of the laser beam. More particularly, the diameter of the Bessel beam and in particular the width of the central lobe in the focusing zone is used. Indeed, the central lobe is the most energetic zone of the beam, that is, the zone which has the most impact on the laminated glass panel, and is therefore the zone to be used as a reference.

In this case, a distance d between two points of impact is chosen to be equal to a value between two and seven times said diameter of the central lobe Pc.

To implement this distance, two parameters of the laser device are taken into account. These parameters are the relative movement speed between the glass panel P and the laser device 10 and the operating frequency.

Indeed, the relative movement speed is representative of the difference in speed of movement that may exist between the glass panel P placed on a support and the laser device, namely that the glass panel P and/or the laser device 10 can move. This movement speed may also be called a scanning speed.

The operating frequency is the frequency with which the pulses are generated.

These two quantities are therefore linked so that the scanning speed and the operating frequency make it possible to define the maximum pitch between two points of impact. Indeed, the operating frequency is expressed in Hertz or in $s^{-1}$ while the scanning speed is expressed in m. s−1 or mm. $s^{-1}$, the ratio between the two makes it possible to obtain a value in m or mm.

In the present case, it is necessary that this value representing the ratio of the scanning speed to the operating frequency be equal to a value between two and seven times said diameter of the central lobe. This makes it possible to determine the frequency and scanning speed values used.

The operating frequency is between 1 and 1000 KHz.

The laser beam is also characterized by its energy per pulse/group of pulses. This varies from 10 to 5000 µJ.

The pulses of the laser beam also have characteristics such as a duration characteristic. Indeed, the amount of energy depends on the intensity of the pulse but also on its duration.

In the context of the present invention, the pulses have a duration of between 0.1 and 100 ps, or even between 0.1 and 10 ps.

In one variant, each pulse of the laser beam is such that it is composed of at least two sub-pulses. It is understood by this that the laser device is such that each pulse is actually a pulse train. These pulses also have a duration between 0.1 and 100 ps, or even between 0.1 and 10 ps.

The frequency of the pulses, linked to the duration between two pulses of the same pulse train, is greater than that of the operating frequency. The frequencies between two pulses of the same pulse train are greater than at least one order of magnitude at the operating frequency.

In a first example, a laminated glass in configuration 22-1 with two glasses of 2 mm (outside manufacturing tolerance) and a range of 0.38 mm is irradiated along a score line with a laser emitting at 1030 nm. The laser emits is configured to emit a train of two pulses of 3 ps at an operating frequency of 5 kHz. The total energy per pulse train is about 1000 µJ. The laser beam is shaped as a Bessel beam of length $L_B$ 4.6 mm and diameter 1 µm (central lobe) moves at 20 mm/s relative to the laminated glass to be cut. In this example, the two pulses of the same group are clocked at 40 MHZ, i.e. a duration of 25 ps between the two.

In a second example, a laminated glass in configuration 22-1 is irradiated along a score line with a laser emitting at 1030 nm. The laser is configured to emit a train of 2 pulses of 300 fs at a rate of 500 kHz. The total energy of the pulse train is about 24 µJ. The laser beam has a Gaussian shape with a diameter of 20 µm at the focus point adjusted to the middle of the PVB sheet. It moves at 2 mm/s relative to the laminated glass to be cut.

After the score line T has been produced, a step, called separation, consisting of applying a mechanical force is carried out. This mechanical force is applied to the glass at the score line (similar to the cutting of a monolithic glass). The two glass sheets 1, 2 having been locally stressed, a crack propagates in both sheets. Furthermore, the PVB having been weakened by the channels created by the laser, the laminated glass separates into two parts under the mechanical action applied for breaking the glass alone, with a good edge quality.

To apply this mechanical force, the support on which the laminated glass panel P is placed comprises breaking means making it possible to exert mechanical pressure on the cutting/separating line.

These breaking means 20 make it possible to exert mechanical pressure on the cutting/separating line in the form of a bead B or a bar, visible in FIG. 7, mounted on a base. The base is movably mounted in order to move in two mutually orthogonal horizontal directions. The base is also arranged to allow the bead B to change height. It is understood by the fact that the bead/bar is capable of being moved vertically. This allows the bead to be brought into contact with the glass panel in order to apply the mechanical pressure.

One of the advantages of the present invention is to allow the production of the score line and the breaking of the glass without excessive handling. Indeed, in a current method, it is often necessary to turn over the glass sheet or glass panel in order to carry out the separation and breaking, or to have a machine capable of exerting pressure on both sides of the laminated glass.

With the present invention and the ability to create a score line over the entire thickness, it becomes unnecessary to handle the glass panel to turn it over to perform the breaking.

These breaking means 20 can also comprise a tracking module such as a camera making it possible to identify the score line.

This tracking module makes it possible on the one hand to verify that the laser beam is opposite the score line.

On the other hand, it is possible for the tracking module to be coupled with a control unit. This coupling of the tracking module with a control unit makes it possible to control the breaking means 20 via the tracking module. It will then be understood that the tracking module is able to identify the score line to control the movement of the rupture means.

In one variant, the breaking means 20 further comprise a pressing unit able to exert pressure on the face opposite the face on which the bead is applied. Indeed, without these breaking means, the weight of the glass sheet acts as a counterweight. This counterweight makes it possible to exert a force that limits the movement of the glass sheet during breaking-out.

Advantageously, this pressing unit comprises at least one pressing element that makes it possible to exert an upper force. This pressing element is in the form of a bead or a stud that bears on the laminated glass panel. In this case of a single pressing element, it bears directly opposite the bead, that is, at the score line.

In an alternative, the pressing unit comprises two pressing elements arranged on either side of the score line.

Of course, the present invention is not limited to the illustrated example but is susceptible to various variants and modifications which will become apparent to the person skilled in the art.

The invention claimed is:

1. A method for separating a panel made of laminated glass, said laminated glass panel comprising at least one interlayer film and at least two glass sheets, with the interlayer film being interposed between said at least two glass sheets, the method comprising:

weakening mechanical properties of the laminated glass panel using energy of a laser beam at least along at least one predetermined separation line, by guiding the laser beam along the separation line, said separation line separating the laminated glass panel into at least two pieces, wherein a laser device is used to provide the laser beam, said laser device being configured to provide a Bessel laser beam with a wavelength to which the at least two glass sheets and the interlayer film are transparent, wherein a length of the laser beam is at least equal to 80% of a thickness of the laminated glass panel and a ratio of a scanning speed to an operating frequency is a value between two and seven times a diameter of a central lobe of the Bessel beam, and wherein the thickness of the laminated glass panel is greater than 4 mm.

2. The method according to claim 1, wherein the weakening of the mechanical properties of the laminated glass panel consists of creating a series of points of impact, each point of impact making it possible to induce a localized stress field in the at least two glass sheets and microchannels in the interlayer film, two successive points of impact being separated by a distance equal to the ratio of the scanning speed to the operating frequency.

3. The method according to claim 1, wherein each point of impact is created by a single pulse.

4. The method according to claim 1, wherein each point of impact is created by a group of at least two pulses.

5. The method according to claim 4, wherein each pulse lasts between 0.1 and 100 ps.

6. The method according to claim 5, wherein a rate between two single pulses or two groups of pulses is between 1 and 1000 kHz.

7. The method according to claim 1, further comprising a separation step consisting of applying a mechanical force.

8. A device for separating a laminated glass panel along at least one predetermined separation line, said laminated glass panel comprising at least one interlayer film and at least two glass sheets, the interlayer film being interposed between the at least two glass sheets, the laminated glass panel being mechanically weakened using the energy of a laser beam at least along the separation line using the method according to claim 1, said device comprising a breaking system making it possible to exert mechanical pressure on the separation line to separate at least two pieces of the laminated glass panel.

9. The separation device according to claim 8, wherein the laser beam is generated by a laser device able to move along two orthogonal axes.

10. The separation device according to claim 8, wherein the breaking system comprises at least one pressing element for exerting said mechanical pressure on the separation line.

11. The separation device according to claim 10, wherein the breaking system further comprises at least one counter-weight element for exerting pressure on the laminated glass panel opposite said mechanical pressure on the separation line.

12. The method according to claim 5, wherein each pulse lasts between 0.1 and 10 ps.

\* \* \* \* \*